(12) United States Patent
Shinaut et al.

(10) Patent No.: US 8,137,049 B2
(45) Date of Patent: *Mar. 20, 2012

(54) REBAR SEPARATOR

(76) Inventors: Ken Shinaut, North Ogden, UT (US); Steven S. Anglesey, Layton, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/825,106

(22) Filed: Jun. 28, 2010

(65) Prior Publication Data

US 2010/0266379 A1 Oct. 21, 2010

Related U.S. Application Data

(63) Continuation of application No. 10/459,938, filed on Jun. 11, 2003, now Pat. No. 7,744,336.

(51) Int. Cl.
*B66F 11/00* (2006.01)
*B65G 25/00* (2006.01)
*B65G 27/00* (2006.01)

(52) U.S. Cl. ............... 414/746.1; 414/746.6; 198/443; 198/774.4; 198/752.1

(58) Field of Classification Search ........... 198/339.1, 198/752.1, 760, 771; 73/570, 662, 663, 666, 73/667, 668, 672

See application file for complete search history.

(56) References Cited

U.S. PATENT DOCUMENTS

| | | | | |
|---|---|---|---|---|
| 2,664,995 A | * | 1/1954 | Renner | 198/760 |
| 3,195,737 A | * | 7/1965 | Melrose | 414/739 |
| 3,561,584 A | * | 2/1971 | Sinyavsky et al. | 198/524 |
| 4,702,403 A | * | 10/1987 | Curles | 225/96.5 |
| 4,766,754 A | * | 8/1988 | Shiue | 72/294 |
| 5,211,277 A | * | 5/1993 | Mount | 198/358 |
| 7,744,336 B2 | * | 6/2010 | Shinaut et al. | 414/746.1 |
| 2004/0253090 A1 | * | 12/2004 | Shinaut et al. | 414/745.1 |

* cited by examiner

Primary Examiner — Gregory Adams
(74) Attorney, Agent, or Firm — Fehr Law Firm; Thompson E. Fehr

(57) ABSTRACT

A rebar separator having a crossbar situated atop one or, preferably, two vibrational insulators which are preferably inflatable cushions. Preferably, there are two or more such crossbars on one or two inflatable cushions. At least one vibrational motor is in contact with at least one crossbar. And preferably each crossbar slopes from a first end to a second end. A source of fluid is in communication with each inflatable cushion. Preferably, the vibrational insulators are placed on top of first and second longitudinal channels of a horizontal rack.

10 Claims, 7 Drawing Sheets

REBAR SEPARATOR

CROSS-REFERENCE TO RELATED APPLICATION

This is a continuation application of U.S. application Ser. No. 10/459,938, filed on Jun. 11, 2003, which will issue as U.S. Pat. No. 7,744,336 on Jun. 29, 2010.

BACKGROUND OF THE INVENTION

1. Field of the Invention

This invention relates to a device for separating rebar from tangled bundles of rebar.

2. Description of the Related Art

Rebar comprises the elongated cylindrical steel rods which are placed within concrete to reinforce such concrete.

The rods of rebar come in bundles and often become entangled with one another.

At a facility which cuts and, on occasion, bends the rebar to make it suitable for particular purposes, a bundle of rebar is placed upon a horizontal rack. Then, after removing the straps which hold the bundle together, an individual manually grasps and shakes one rod at a time until it is loosened from the other rods. Such rod is then moved to a portion of the horizontal rack which can have one edge lowered to dump the separated rod onto rollers to be transported for measuring and cutting.

One prior non-manual separator for rebar of which the present inventor is aware is that described in U.S. Pat. No. 6,357,995. That separator utilizes a "blade-like member 55" that is moved longitudinally with respect to the rebar. Apparently, it is inserted between two intertwined pieces of rebar and then moved longitudinally.

U.S. Pat. No. 3,112,823 of Albert Musschoot shows a frame 6 on air spring isolators 4, 5.

As a first, relatively minor, point, Musschoot discloses, in lines 29 through 31, "a plurality of vibratory feeders 1, 2, and 3 . . . with their individual controls," not a separator.

More importantly, though, the element in Musschoot which is analogous to the crossbars 1 of the present Application is the frame 6 to which the exciter 11 is attached in order to produce vibration and which frame 6 acts, according to line 39 through 42 in column 2 of Muschoot, as "a support for a shallow trough 9 serving as a material conveying surface." And the frame 6 is not slanted.

U.S. Pat. No. 3,235,721 of Franklin D. Lakins discloses simply a box with an open top. The box is tilted from side to side in order to separate to unscramble bundles of bar stock. When the bundle has been sufficiently unscrambled, the box is tilted toward a side which has fluid-powered cylinders that push a selected bar high enough to fall over the lower side of the tilted box.

Lines 46 through 58 in column 1 of Lakins explain, "Briefly described, the machine comprising the preferred embodiment of the invention is made up of a long box, capable of containing bar stock up to 22 feet in length, and bundles of such bar stock weighing as much as ten thousand pounds. The box is pivotally mounted along its center line and means are provided for alternately tilting the box along its pivot points up to 10° on both sides of horizontal, which causes the bar stock to roll from side to side until the individual bars are lying straight and are unscrambled. Thereafter, one side of the box is provided with selectively operable discharge means which functions to discharge the bar stock from the box in single fashion."

Lines 16 through 19 in column 2 of Lakins further clarify, "A plurality of cross rail angle irons 20 extend across the channel members 14, 16 and 18 and are affixed thereto by welding, or the like, to provide a floor for the machine . . . ."

And line 1 through 19 in column 3 of Lakins provide, "The mounting of the box on the supporting structure by means of the clevis brackets 70 and bearings 76 permit oscillation of the box about the horizontal plane. The oscillation of the box is effected by three tilt cylinders 102 which have a bracket 104 affixed between apertured ears 106 of a pair of plates 108 affixed to and carried by three of the support legs 92. The rod 110 of the cylinder 102 has a clevis 112 connected to its outer end, and the clevis is connected by means of a pin 114 to a depending boss 116 affixed to the underside of the channel member 18 at three spaced positions along the channel member 18. Accordingly, it will be seen that when fluid is admitted to the lower end of the cylinders 102, the box will be oscillated in a counter-clockwise direction as viewed in FIGS. 2 and 3, about the axis of the bearing pins 74 to about 10° from the horizontal plane, and when fluid is admitted to the upper end of the cylinder 102, the box will be oscillated clockwise 10° of the horizontal plane."

Furthermore, the cylinders 102 of Lakins do not vibrate the box; as Lakins, itself, declares, the cylinders 102 "tilt" the box "along its pivot points."

Consequently, Lakins has no vibratory motor and lacks a vibrational insulator.

As can be seen in the quotation from Lakins above, element 70 is clevis brackets which enable the box to pivot. Clevis brackets must be rigid structures to support the box and would not deter the passage of vibrations. [It should be noted that, in an apparent error, line 56 in column 2 of Lakins uses "70" also to designate "bolts." Bolts, however, would also not deter the passage of vibrations.]

Lakins, moreover, does not disclose slanted crossbars. The box of Lakins is composed of some bars, and the whole box is able to be tilted but such bars do not slant with respect to the box and are not permanently slanted with respect to the base of the Lakins machine.

In addition to the two or more crossbars and the vibrational motor which U.S. Pat. No. 3,086,637 of Rudolf Graef has, in order to separate rods, Graef uses rollers in combination with the crossbars and vibrational motors.

Graef states (in lines 46 through 49 of column 1, lines 44 through 50 of column 2, and lines 4 through 9 of column 3), ". . . the vibrations coupled with the brief interruptions in the forward push on the rods reduces the friction of the rods against each other and disentangles them . . . .

" . . . at least one vibratory device positioned along said track for repeatedly lifting said rods off said rollers for a short interval of time; said repeatedly lifting of said rods off said drive rollers causing an intermittent stoppage of the forward movement of said rods so as to reduce the friction between said rods for a short interval of time . . . .

" . . . said vibratory devices each periodically raising and lowering said rods as they pass thereover; and said periodic raising and lowering of said rods causing a brief stoppage of the forward movement of said rods so as to reduce the friction between and entanglement of said rods . . . ."

And, notably, the crossbars of Graef are not slanted.

BRIEF SUMMARY OF THE INVENTION

The Rebar Separator of the present invention isolates one or more crossbars from a rack used to hold rebar and utilizes a motor to vibrate such crossbars. ("Vibration," as used herein means rapid periodic movement, which Applicants believe is consistent with both ordinary understanding as well as the definition for "vibrate" given in *The Oxford English Dictionary*, second edition (1989), viz., "to move rapidly to and fro, to brandish, shake, etc. . . . .") Such vibration tends to separate rods of rebar that are tangled with one another when initially placed upon the crossbars.

The crossbars are placed atop horizontal racks that are traditionally used to hold rebar; are isolated from such racks by cushions which can be filled with fluid, preferably, air; and preferably have a slanted top.

Significantly, the crossbars and vibratory motor of the present invention perform the function of separating the rebar while eliminating the drive rollers of Graef.

DETAILED DESCRIPTION OF THE INVENTION

Figure 1:
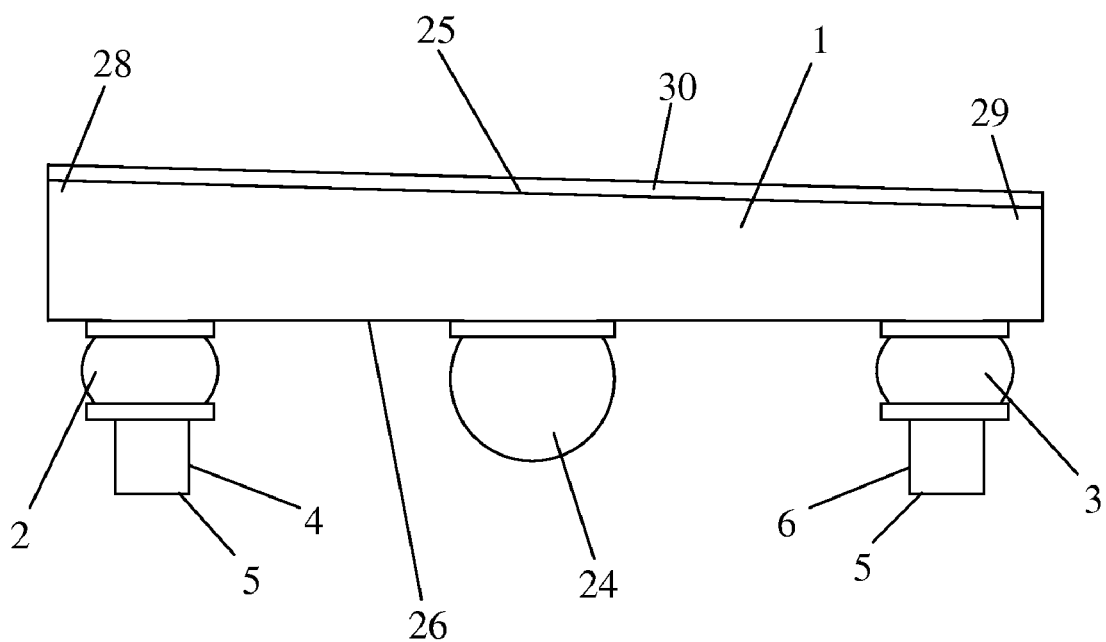
FIG. 1 illustrates a crossbar, having a slanted top, placed atop two cushions resting on two inflatable cushions atop longitudinal channels of a horizontal rack.

As illustrated in FIG. 1, the Rebar Separator has a crossbar 1 that is placed atop a first vibrational insulator, preferably an inflatable cushion, 2 and, preferably, also atop a second vibrational insulator, preferably an inflatable cushion, 3. The first cushion 2 is preferably located on top of a first longitudinal channel 4 of a horizontal rack 5; the second cushion 3 is preferably located on top of a second longitudinal channel 6 of the horizontal rack 5.

Figure 2:
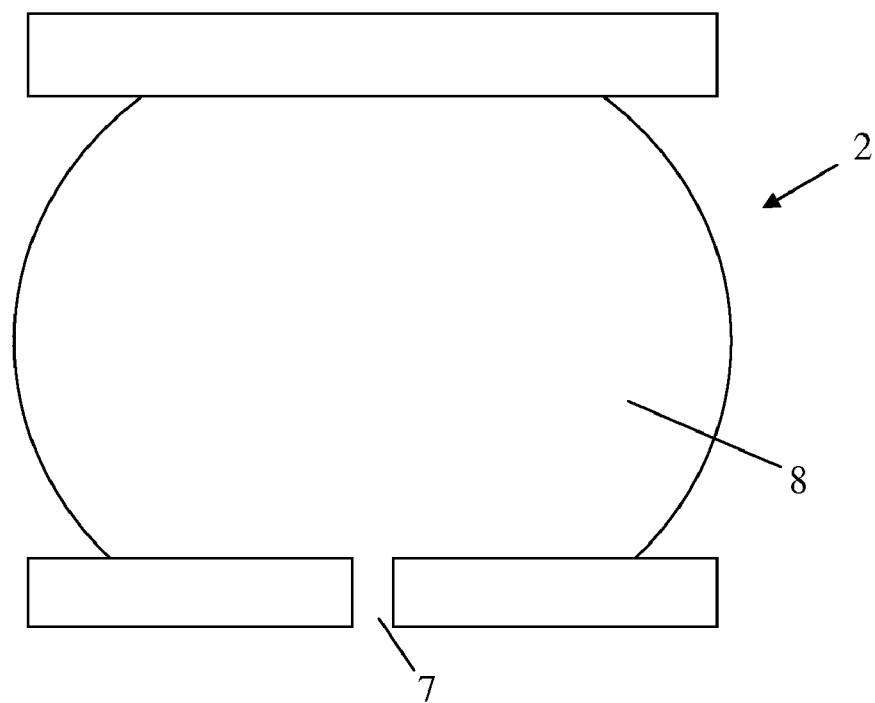
FIG. 2 is a cross-sectional view of a first inflatable cushion.
Figure 3:
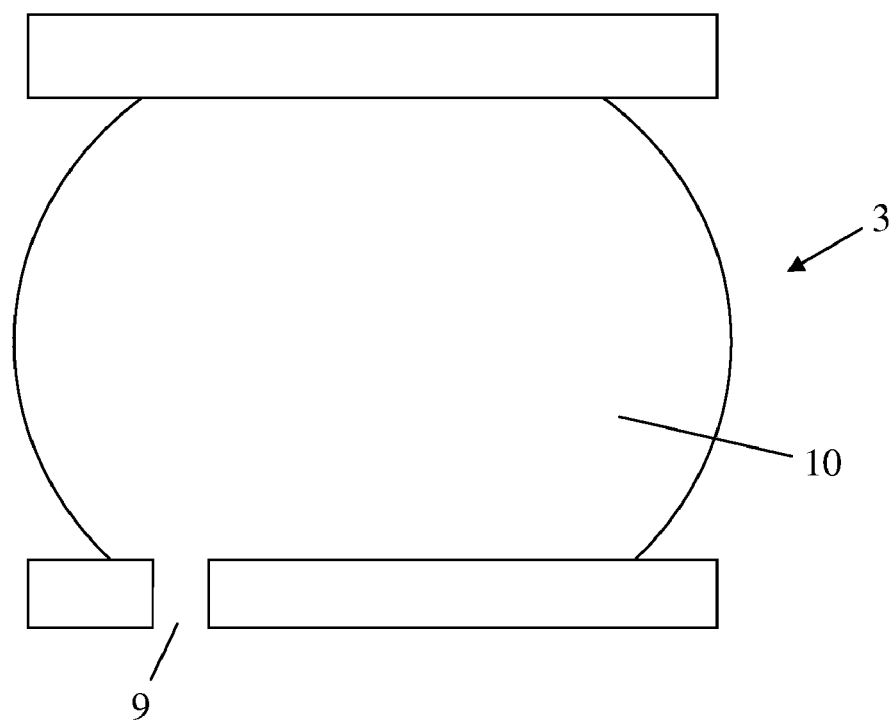
FIG. 3 provides a cross-sectional view of a second inflatable cushion, with the aperture in an alternate location from that in the embodiment of FIG. 2.

The first cushion 2 contains an aperture 7, depicted in FIG. 2, which aperture 7 communicates with the interior 8 of the first inflatable cushion 2. Similarly, the second cushion 3 contains an aperture 9, depicted in FIG. 3, which aperture 9 communicates with the interior 10 of the second inflatable cushion 3.

A fluid, preferably air, is provided to, and withdrawn from, the first inflatable cushion 2 through aperture 7. Similarly, a fluid, preferably air, is provided to, and withdrawn from, the second inflatable cushion 3 through aperture 9.

Figure 4:
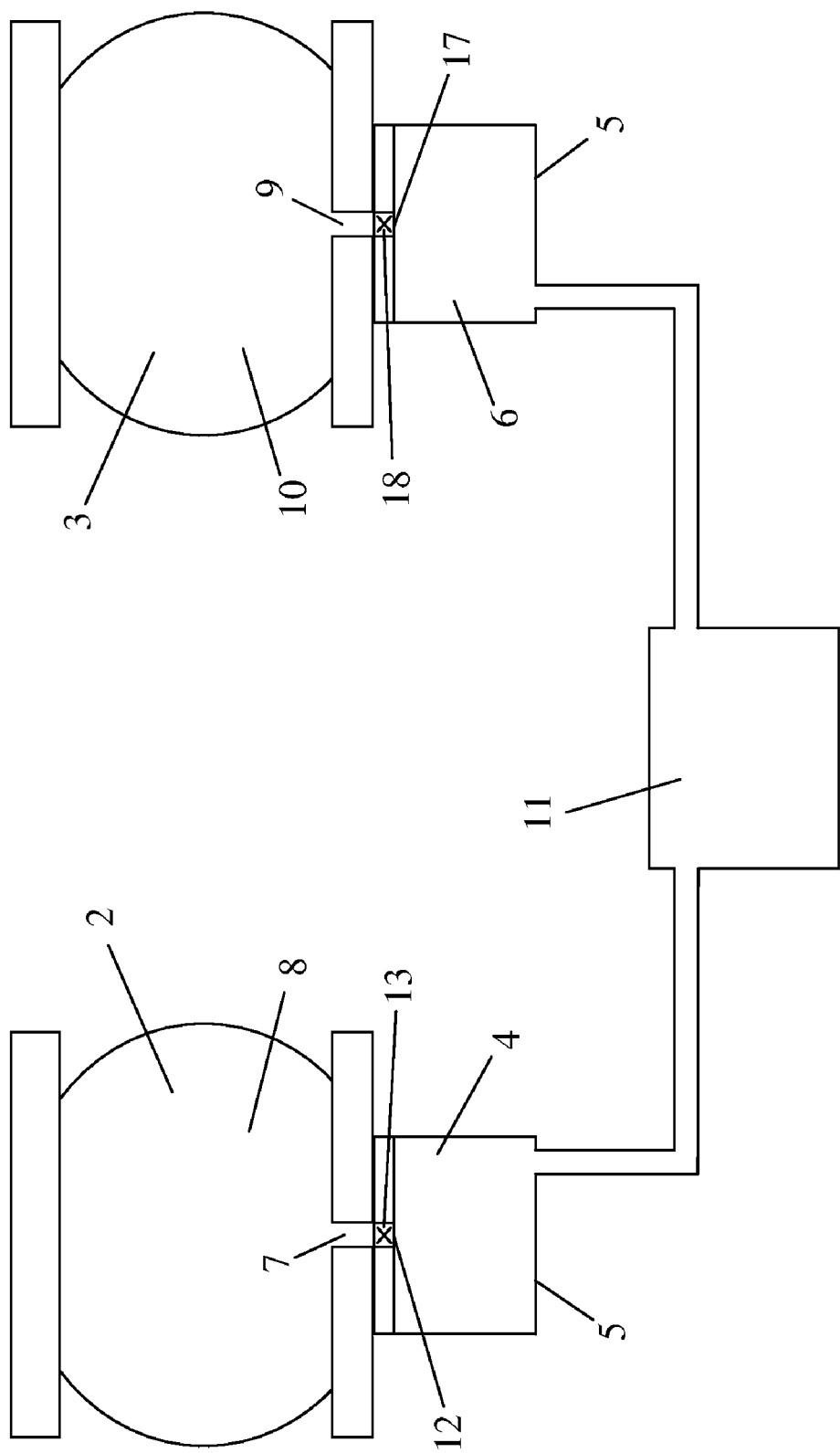
FIG. 4 portrays, in cross-sectional view, a first longitudinal channel in fluid communication both with a first inflatable cushion and a source of fluid and a second longitudinal channel in fluid communication both with a first inflatable cushion and a source of fluid.
Figure 5:
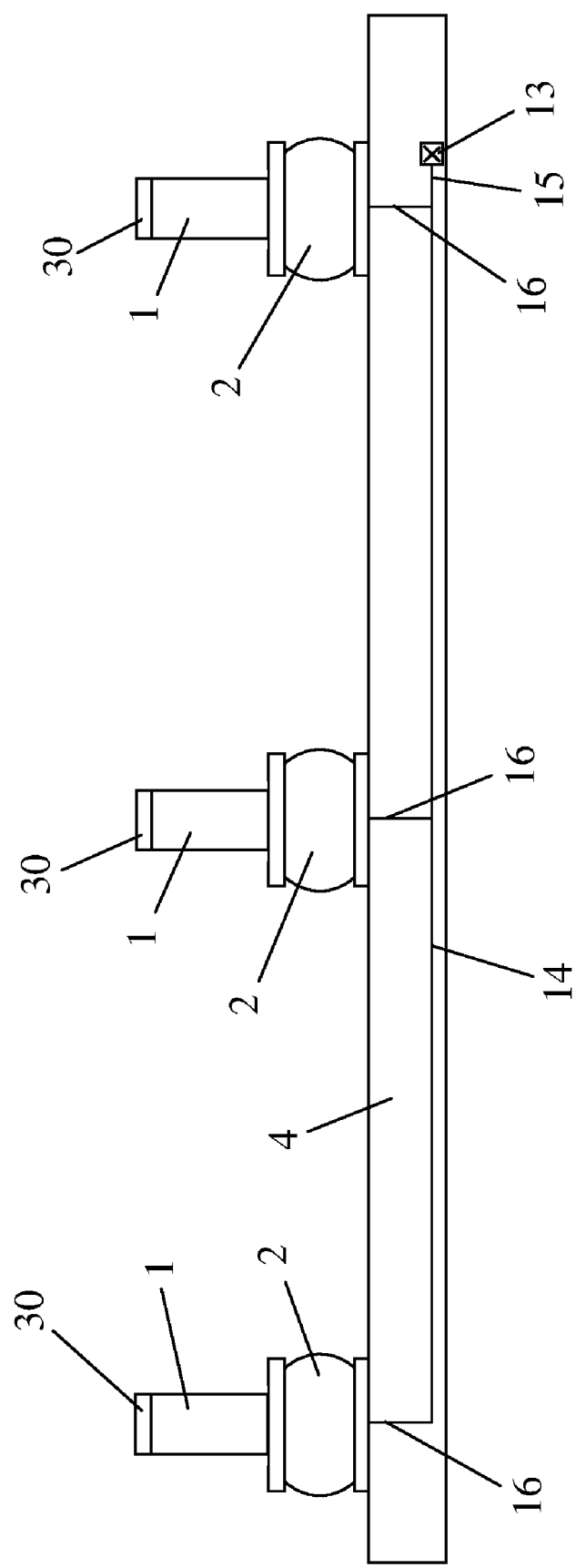
FIG. 5 shows a first branched, hollow line inserted, with fluid communication, between a first longitudinal channel and several first inflatable cushions.

If the first longitudinal channel 4 is hollow, such first longitudinal channel 4 is, as shown in FIG. 4, in fluid communication with a source 11 of fluid and contains an aperture 12 in fluid communication with the aperture 7 of the first inflatable cushion 2 of associated with each given crossbar 1 (since it is preferable to employ two or more crossbars 1 on each horizontal rack 5). A valve 13 is preferably inserted between the aperture 12 and the corresponding aperture 7 to control the flow of fluid into or from the first inflatable cushion 2. And, even more preferably, as illustrated in FIG. 5, a first hollow tube 14 has a first end 15 attached to, and in fluid communication with, the valve 13, which, in such option, is fluidically, but not necessarily physically, between the aperture 12 and the apertures 7. (Also, in such option, the location of the aperture 12 is not necessarily the same as when the valve 13 is physically between aperture 12 and aperture 7.) The first hollow tube 14 branches in order to have two or more, preferably three, second ends 16 with each of the second ends 16 connected to, and in fluid communication with, an aperture 7 of a first inflatable cushion 2.

Figure 6:
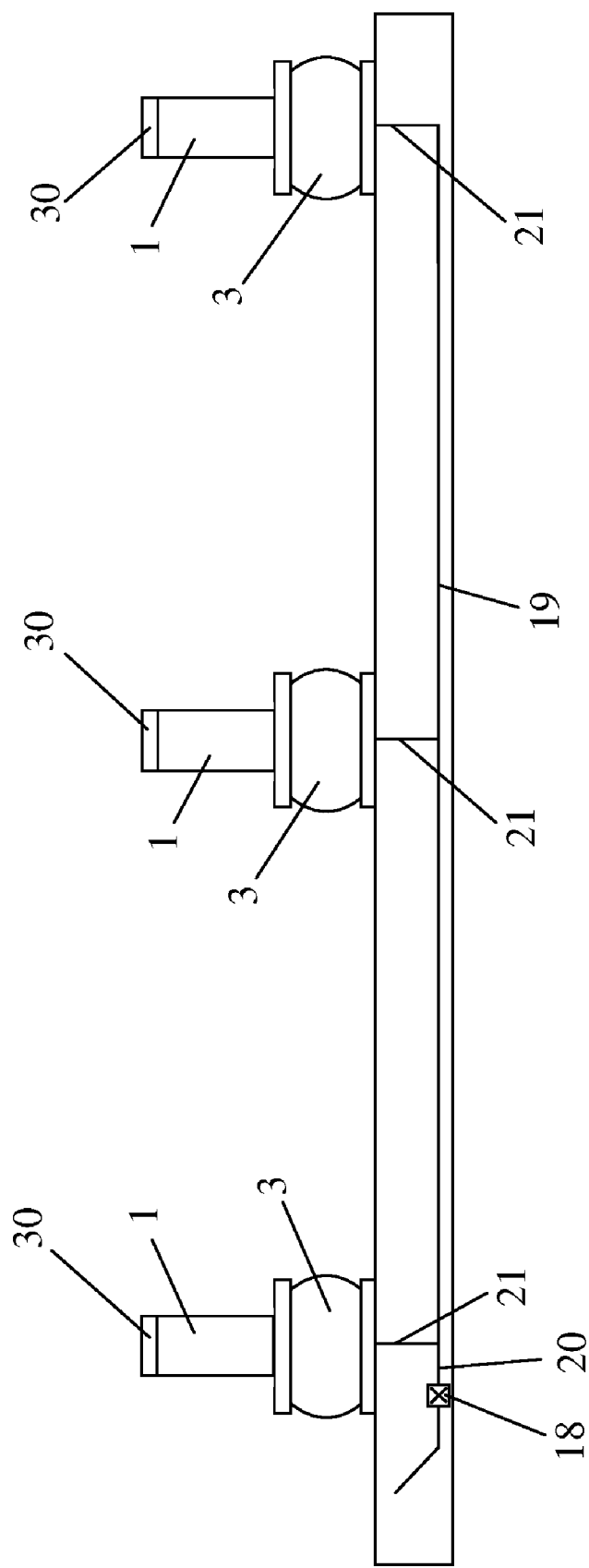
FIG. 6 illustrates a second branched, hollow line inserted, with fluid communication, between a second longitudinal channel and several second inflatable cushions.

Similarly, if the second longitudinal channel 6 is hollow, such second longitudinal channel 6 is, as shown in FIG. 4, in fluid communication with a source 11 of fluid and contains an aperture 17 in fluid communication with the aperture 9 of the second inflatable cushion 3 associated with each given crossbar 1 (since it is preferable to employ two or more crossbars 1 on each horizontal rack 5). A valve 18 is preferably inserted between an aperture 17 and the corresponding aperture 9 to control the flow of fluid into or from the second inflatable cushion 3. And, even more preferably, as illustrated in FIG. 6, a second hollow tube 19 has a first end 20 attached to, and in fluid communication with, the valve 18, which, in such option, is fluidically, but not necessarily, physically between the aperture 17 and the apertures 9. (Also, in such option, the location of the aperture 17 is not necessarily the same as when the valve 18 is physically between aperture 17 and an aperture 9). The second hollow tube 19 branches in order to have two or more, preferably three, second ends 21 with each of the second ends 21 connected to, and in fluid communication with, an aperture 9 of a second inflatable cushion 3.

Figure 7:
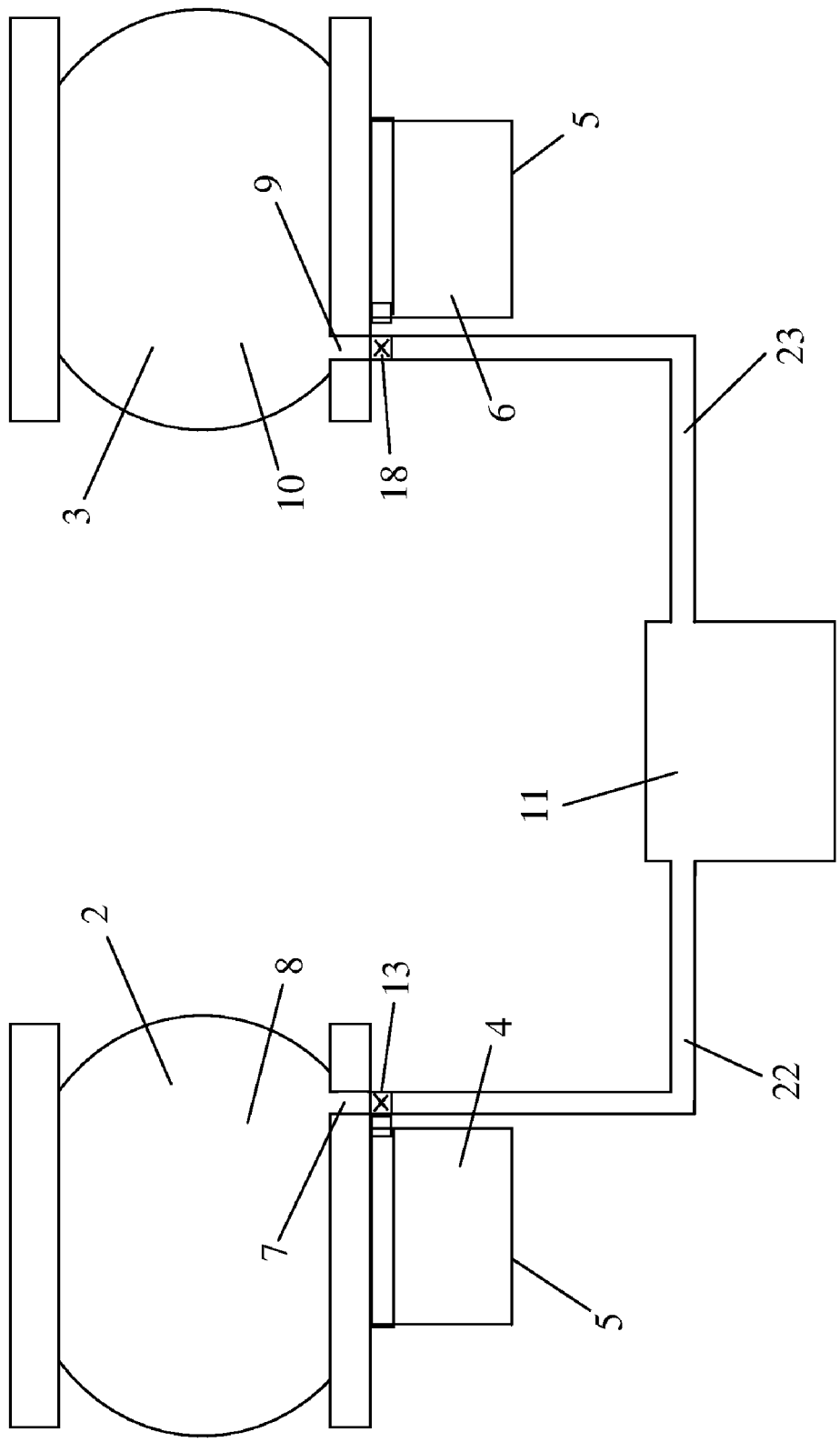
FIG. 7 shows hollow lines replacing the first and second longitudinal channels in the embodiment of FIG. 4, for the purpose of supplying fluid.

Optionally, as portrayed in FIG. 7, the first longitudinal channel 4 can, for the purpose of supplying fluid, be replaced by a first hollow tube 22; and the second longitudinal channel 6 can, for the purpose of supplying fluid, be replaced by a second hollow tube 23.

Also in contact with, and preferably attached to, the crossbar 1 is a vibrational motor 24. The vibrational motor can be located anywhere on the crossbar 1 that will not impede the movements of rods of rebar, which are to be placed on the top 25 of the crossbar 1, making the bottom 26 of the crossbar between the first inflatable cushion 2 and the second inflatable cushion 3 the preferred location for the vibrational motor 24, as seen in FIG. 1. When several crossbars 1 are employed on a given horizontal rack 5, it is, however, not necessary to have a vibrational motor attached to each crossbar 1.

Figure 8:
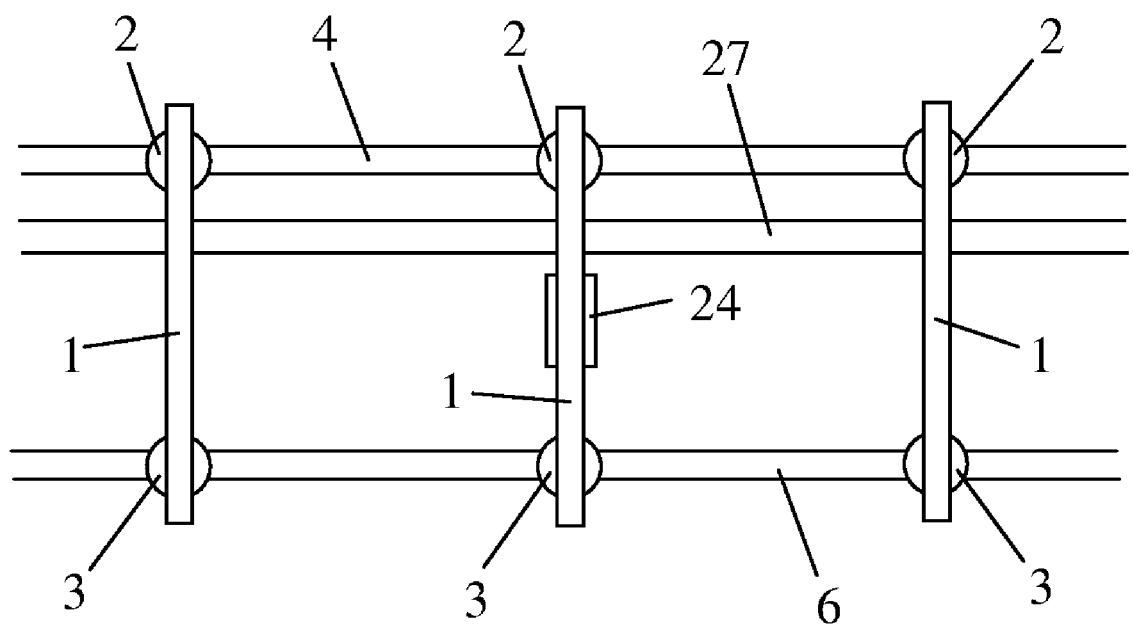
FIG. 8 depicts a substantially rigid torsion bar attached to several crossbars.

Optionally, a substantially rigid torsion bar 27 is, as depicted in FIG. 8, attached to one or more, and preferably each, crossbar 1, in order to increase the uniformity of vibration of the crossbars 1. Substantially, in this context, means that the amount the rigid torsion bar 27 moves under force is only such that one of ordinary skill in the field would consider the torsion bar 27 to be rigid.

Preferably, the top 25 of the crossbar 1 slants, as illustrated in FIG. 1, downward from a first end 28 of the crossbar 1 to a second end 29 of the crossbar 1 in order to encourage the rods of rebar to move toward the second end 29 of the crossbar 1 when the vibrational motor 24 is activated, although the direction of movement of such rods tends to reverse when the vibrational motor 24 is operated in a reverse direction.

Also, the second inflatable cushion 3 can be inflated less that the first inflatable cushion 2 in order to increase the tendency of the rods of rebar to move toward the second end 29 of the crossbar 1.

Preferably, the crossbar 1 is made of metal; and, optionally, a layer 30 that is softer than metal can be placed on the top 25 of the crossbar 1 in order to protect the rods of rebar. A preferred material from which the layer 30 is made is ultra-high-weight molecular plastic (UHWM).

As used herein the term "preferable" or "preferably" means that a specified element or technique is more acceptable than another but not that such specified element or technique is a necessity.

We claim:

1. A rebar separator, which comprises:
   two or more crossbars, each of said crossbars having a top, a first end, and a second end with the top of each of said crossbars slanting downward from the first end of said crossbar to the second end of said crossbar;
   a vibrational motor in contact with one of said crossbars;
   for each of said crossbars, a first inflatable cushion under said crossbar;
   for each of said crossbars, a second inflatable cushion under said crossbar;
   a horizontal rack having a first longitudinal channel supporting said first inflatable cushions and a second longitudinal channel supporting said second inflatable cushions, wherein said first longitudinal channel and said second longitudinal channel are both hollow; and
   a source of air in fluid communication with said first longitudinal channel and in fluid communication with said second longitudinal channel.

2. The rebar separator as recited in claim 1, further comprising:
   for each first vibrational insulator, a valve, said valve being in fluid communication with said first vibrational insulator and with said first longitudinal channel; and
   for each second vibrational insulator, a valve, said valve being in fluid communication with said second vibrational insulator and with said second longitudinal channel.

3. The rebar separator as recited in claim 1, further comprising:
   groups of multiple first vibrational insulators;
   for each group of multiple first vibrational insulators, a valve, said valve being in fluid communication with each first vibrational insulator in said group and with said first longitudinal channel, the groups be selected such that each first vibrational insulator is in one, but only one, group;
   groups of multiple second vibrational insulators; and
   for each group of multiple second vibrational insulators, a valve, said valve being in fluid communication with each second vibrational insulator in said group and with said second longitudinal channel, the groups be selected such that each second vibrational insulator is in one, but only one, group.

4. A rebar separator, which comprises:
   two or more crossbars, each of said crossbars having a top, a first end, and a second end with the top of each of said crossbars slanting downward from the first end of said crossbar to the second end of said crossbar;
   a vibrational motor in contact with one of said crossbars;
   for each of said crossbars, a first inflatable cushion under said crossbar;
   for each of said crossbars, a second inflatable cushion under said crossbar;
   a horizontal rack having a first longitudinal channel supporting said first inflatable cushions and a second longitudinal channel supporting said second inflatable cushions;
   a first hollow tube;
   a second hollow tube; and
   a source of air in fluid communication with said first hollow tube and in fluid communication with said second hollow tube.

5. The rebar separator as recited in claim 4, further comprising:
   for each first vibrational insulator, a valve, said valve being in fluid communication with said first vibrational insulator and with said first hollow tube; and
   for each second vibrational insulator, a valve, said valve being in fluid communication with said second vibrational insulator and with said second hollow tube.

6. The rebar separator as recited in claim 4, further comprising:
   groups of multiple first vibrational insulators;
   for each group of multiple first vibrational insulators, a valve, said valve being in fluid communication with each first vibrational insulator in said group and with said first hollow tube, the groups be selected such that each first vibrational insulator is in one, but only one, group;
   groups of multiple second vibrational insulators; and
   for each group of multiple second vibrational insulators, a valve, said valve being in fluid communication with each second vibrational insulator in said group and with said second hollow tube, the groups be selected such that each second vibrational insulator is in one, but only one, group.

7. A rebar separator, which comprises:
   two or more crossbars, each of said crossbars having a top, a first end, and a second end with the top of each of said crossbars slanting downward from the first end of said crossbar to the second end of said crossbar;
   a vibrational motor in contact with one of said crossbars;
   for each of said crossbars, a first vibrational insulator under said crossbar, said first vibrational insulator being an inflatable cushion;
   for each of said crossbars, as second vibrational insulator under said crossbar, said;
   a horizontal rack having a hollow first longitudinal channel supporting said first vibrational insulators and a hollow second longitudinal channel supporting said second vibrational insulators;
   a source of air in fluid communication with said first longitudinal channel and in fluid communication with said second longitudinal channel;
   for each first vibrational insulator, a valve, said valve being in fluid communication with said first vibrational insulator and with said first longitudinal channel; and
   for each second vibrational insulator, a valve, said valve being in fluid communication with said second vibrational insulator and with said second longitudinal channel.

8. A rebar separator, which comprises:
   two or more crossbars, each of said crossbars having a top, a first end, and a second end with the top of each of said crossbars slanting downward from the first end of said crossbar to the second end of said crossbar;
   a vibrational motor in contact with one of said crossbars;
   for each of said crossbars, a first vibrational insulator under said crossbar, said first vibrational insulator being an inflatable cushion;
   for each of said crossbars, as second vibrational insulator under said crossbar, said;

a horizontal rack having a hollow first longitudinal channel supporting said first vibrational insulators and a hollow second longitudinal channel supporting said second vibrational insulators;

a source of air in fluid communication with said first longitudinal channel and in fluid communication with said second longitudinal channel;

groups of multiple first vibrational insulators;

for each group of multiple first vibrational insulators, a valve, said valve being in fluid communication with each first vibrational insulator in said group and with said first longitudinal channel, the groups be selected such that each first vibrational insulator is in one, but only one, group;

groups of multiple second vibrational insulators; and for each group of multiple second vibrational insulators, a valve, said valve being in fluid communication with each second vibrational insulator in said group and with said second longitudinal channel, the groups be selected such that each second vibrational insulator is in one, but only one, group.

9. A rebar separator, which comprises:

two or more crossbars, each of said crossbars having a top, a first end, and a second end with the top of each of said crossbars slanting downward from the first end of said crossbar to the second end of said crossbar;

a vibrational motor in contact with one of said crossbars;

for each of said crossbars, a first vibrational insulator under said crossbar, said first vibrational insulator being an inflatable cushion;

for each of said crossbars, as second vibrational insulator under said crossbar, said;

a horizontal rack having a first longitudinal channel supporting said first vibrational insulators and a second longitudinal channel supporting said second vibrational insulators;

a first hollow tube;

a second hollow tube;

a source of air in fluid communication with said first hollow tube and in fluid communication with said second hollow tube; and for each first vibrational insulator, a valve, said valve being in fluid communication with said first vibrational insulator and with said first hollow tube; and for each second vibrational insulator, a valve, said valve being in fluid communication with said second vibrational insulator and with said second hollow tube.

10. A rebar separator, which comprises:

two or more crossbars, each of said crossbars having a top, a first end, and a second end with the top of each of said crossbars slanting downward from the first end of said crossbar to the second end of said crossbar;

a vibrational motor in contact with one of said crossbars;

for each of said crossbars, a first vibrational insulator under said crossbar, said first vibrational insulator being an inflatable cushion;

for each of said crossbars, as second vibrational insulator under said crossbar, said;

a horizontal rack having a first longitudinal channel supporting said first vibrational insulators and a second longitudinal channel supporting said second vibrational insulators;

a first hollow tube;

a second hollow tube;

a source of air in fluid communication with said first hollow tube and in fluid communication with said second hollow tube;

groups of multiple first vibrational insulators;

for each group of multiple first vibrational insulators, a valve, said valve being in fluid communication with each first vibrational insulator in said group and with said first hollow tube, the groups be selected such that each first vibrational insulator is in one, but only one, group;

groups of multiple second vibrational insulators; and groups of multiple second vibrational insulators; and for each group of multiple second vibrational insulators, a valve, said valve being in fluid communication with each second vibrational insulator in said group and with said second hollow tube, the groups be selected such that each second vibrational insulator is in one, but only one, group.

* * * * *